United States Patent
Crook et al.

(10) Patent No.: US 7,200,738 B2
(45) Date of Patent: Apr. 3, 2007

(54) REDUCING DATA HAZARDS IN PIPELINED PROCESSORS TO PROVIDE HIGH PROCESSOR UTILIZATION

(75) Inventors: Neal Andrew Crook, Reading (GB); Alan T Wootton, Saratoga, CA (US); James Peterson, Portland, OR (US)

(73) Assignee: Micron Technology, Inc., Boise, ID (US)

( * ) Notice: Subject to any disclaimer, the term of this patent is extended or adjusted under 35 U.S.C. 154(b) by 405 days.

(21) Appl. No.: 10/125,331

(22) Filed: Apr. 18, 2002

(65) Prior Publication Data

US 2003/0200421 A1   Oct. 23, 2003

(51) Int. Cl.
G06F 9/38 (2006.01)
G06F 9/50 (2006.01)

(52) U.S. Cl. ............................ 712/219; 712/213
(58) Field of Classification Search ............... 712/27, 712/219, 245, 246, 213; 711/125, 220; 717/159
See application file for complete search history.

(56) References Cited

U.S. PATENT DOCUMENTS

| | | | |
|---|---|---|---|
| 5,450,556 A * | 9/1995 | Slavenburg et al. ........ 712/235 |
| 5,712,996 A * | 1/1998 | Schepers ................... 712/216 |
| 5,805,914 A * | 9/1998 | Wise et al. ................. 382/232 |
| 5,911,057 A * | 6/1999 | Shiell ......................... 712/217 |
| 6,044,450 A * | 3/2000 | Tsushima et al. ............ 712/24 |
| 6,230,253 B1 * | 5/2001 | Roussel et al. .............. 712/22 |
| 6,279,100 B1 * | 8/2001 | Tremblay et al. ............ 712/24 |
| 6,292,939 B1 * | 9/2001 | Itou et al. ................... 717/149 |
| 6,324,639 B1 * | 11/2001 | Heishi et al. ................ 712/212 |
| 6,360,312 B1 * | 3/2002 | Kawaguchi ................. 712/215 |

\* cited by examiner

*Primary Examiner*—Daniel H. Pan
(74) *Attorney, Agent, or Firm*—Fish & Neave IP Group Ropes & Gray LLP

(57) ABSTRACT

A pipelined computer processor is presented that reduces data hazards such that high processor utilization is attained. The processor restructures a set of instructions to operate concurrently on multiple pieces of data in multiple passes. One subset of instructions operates on one piece of data while different subsets of instructions operate concurrently on different pieces of data. A validity pipeline tracks the priming and draining of the pipeline processor to ensure that only valid data is written to registers or memory. Pass-dependent addressing is provided to correctly address registers and memory for different pieces of data.

43 Claims, 14 Drawing Sheets

|        | A    | D    | G    | B    | E    | H    | C    | F    | I    |
|--------|------|------|------|------|------|------|------|------|------|
| PASS 1 | A(1) | D(-) | G(-) | B(1) | E(-) | H(-) | C(1) | F(-) | I(-) |
| PASS 2 | A(2) | D(1) | G(-) | B(2) | E(1) | H(-) | C(2) | F(1) | I(-) |
| PASS 3 | A(3) | D(2) | G(1) | B(3) | E(2) | H(1) | C(3) | F(2) | I(1) |
| PASS 4 | A(-) | D(3) | G(2) | B(-) | E(3) | H(2) | C(-) | F(3) | I(2) |
| PASS 5 | A(-) | D(-) | G(3) | B(-) | E(-) | H(3) | C(-) | F(-) | I(3) |

*FIG. 6*

| | | | | | | | | | | | | | | | | | | | | | | | | | | | |
|---|---|---|---|---|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 |
| SUBSET I | $A_1$ | • | • | $B_1$ | • | • | $C_1$ | • | • | $A_2$ | • | • | $B_2$ | • | • | $C_2$ | • | • | $B_3$ | • | • | $C_3$ | | | | | |
| SUBSET II | | | | | | | | | | $D_1$ | | | $E_1$ | | | $F_1$ | | | $D_2$ | | | $E_2$ | | | $F_2$ | | |
| SUBSET III | | | | | | | | | | | | | | | | | | | $G_1$ | | | $H_1$ | | | $I_1$ | | |
| | PASS 1 | | | | | | | | | PASS 2 | | | | | | | | | PASS 3 | | | | | | | | |

CYCLES

| | 28 | 29 | 30 | 31 | 32 | 33 | 34 | 35 | 36 | 37 | 38 | 39 | 40 | 41 | 42 | 43 | 44 | 45 | 46 | 47 | 48 | 49 | 50 | 51 | 52 | 53 | 54 |
|---|---|---|---|---|---|---|---|---|---|---|---|---|---|---|---|---|---|---|---|---|---|---|---|---|---|---|---|
| SUBSET I | $A_4$ | | | $B_4$ | | | $C_4$ | | | $A_5$ | | | $B_5$ | | | $C_5$ | | | $A_6$ | | | $B_6$ | | | $C_6$ | | ⋮ |
| SUBSET II | $D_3$ | | | $E_3$ | | | $F_3$ | | | $D_4$ | | | $E_4$ | | | $F_4$ | | | $D_5$ | | | $E_5$ | | | $F_5$ | | |
| SUBSET III | $G_2$ | | | $H_2$ | | | $I_2$ | | | $G_3$ | | | $H_3$ | | | $I_3$ | | | $G_4$ | | | $H_4$ | | | $I_4$ | | |
| | PASS 4 | | | | | | | | | PASS 5 | | | | | | | | | PASS 6 | | | | | | | | |

CYCLES

FIG. 7

| | A | D | G | B | E | H | C | F | I |
|---|---|---|---|---|---|---|---|---|---|
| PASS 1 | A(1) | D(-) | G(-) | B(1) | E(-) | H(-) | C(1) | F(-) | I(-) |
| PASS 2 | A(2) | D(1) | G(-) | B(2) | E(1) | H(-) | C(2) | F(1) | I(-) |
| PASS 3 | A(3) | D(2) | G(1) | B(3) | E(2) | H(1) | C(3) | F(2) | I(1) |
| PASS 4 | A(4) | D(3) | G(2) | B(4) | E(3) | H(2) | C(4) | F(3) | I(2) |
| PASS 5 | A(5) | D(4) | G(3) | B(5) | E(4) | H(3) | C(5) | F(4) | I(3) |
| PASS 6 | A(6) | D(5) | G(4) | B(6) | E(5) | H(4) | C(6) | F(5) | I(4) |
| | | D(6) | G(5) | • | E(6) | H(5) | • | F(6) | I(5) |
| | • | • | G(6) | • | • | H(6) | • | • | I(6) |
| | • | • | • | • | • | • | • | • | • |
| PASS N | A(N) | D(-) | G(N) | B(N) | E(N) | H(-) | C(N) | F(-) | I(-) |
| PASS N+1 | A(-) | D(N) | G(-) | B(-) | E(-) | H(-) | C(-) | F(N) | I(-) |
| PASS N+2 | A(-) | D(-) | G(-) | B(-) | E(-) | H(N) | C(-) | F(-) | I(N) |

FIG. 8

|  | STAGE 1 | STAGE 1 | STAGE 1 |
|---|---|---|---|
| PROGRAM START | V = 0 | V = 0 | V = 0 |
| START OF PASS 1 | V = 1 | V = 0 | V = 0 |
| START OF PASS 2 | V = 1 | V = 1 | V = 0 |
| START OF PASS 3 | V = 1 | V = 1 | V = 1 |
| START OF PASS 4 | V = 0 | V = 1 | V = 1 |
| START OF PASS 5 | V = 0 | V = 0 | V = 1 |

| PHYSICAL REGISTER NUMBER | REGISTER NAME | PASS USED |
|---|---|---|
| 0 | R0 | 1 |
| 1 | R1 | 1 |
| 2 | R0 | 2 |
| 3 | R1 | 2 |
| 4 | R0 | 3 |
| 5 | R1 | 3 |
| . | . | . |
| . | . | . |
| . | . | . |

Rows 0–1: 1002; Rows 2–3: 1004; Rows 4–5: 1006

| PHYSICAL REGISTER NUMBER | REGISTER NAME | PASS USED |
|---|---|---|
| 0 | R0 | 1 |
| 1 | R0 | 2 |
| 2 | R0 | 3 |
| 3 | R1 | 1 |
| 4 | R1 | 2 |
| 5 | R1 | 3 |
| . | . | . |
| . | . | . |
| . | . | . |

Rows 0–2: 1102; Rows 3–5: 1104

*FIG. 11*

| CURRENT PASS | STAGE 1 | | STAGE 2 | | STAGE 3 | |
|---|---|---|---|---|---|---|
| 1 | X | V=1 | D/C | V=0 | D/C | V=0 |
| 2 | X+3 | V=1 | X | V=1 | D/C | V=0 |
| 3 | X+6 | V=1 | X+3 | V=1 | X | V=1 |
| 4 | X+9 | V=0 | X+6 | V=1 | X+3 | V=1 |
| 5 | X+9 | V=0 | X+9 | V=0 | X+6 | V=1 |

FIG. 13

| CURRENT PASS | INSTRUCTION A (PASS 1) | INSTRUCTION D (PASS 2) | INSTRUCTION G (PASS 3) |
|---|---|---|---|
| 1 | FRAME (1) = X<br>OFFSET = 2 | | |
| 2 | FRAME (1) = X + 3<br>OFFSET = 2 | FRAME (2) = X<br>OFFSET = 0 | |
| 3 | FRAME (1) = X + 6<br>OFFSET = 2 | FRAME (2) = X + 3<br>OFFSET = 0 | FRAME (3) = X<br>OFFSET = 1 |
| 4 | | FRAME (2) = X + 6<br>OFFSET = 0 | FRAME (3) = X + 3<br>OFFSET = 1 |
| 5 | | | FRAME (3) = X + 6<br>OFFSET = 1 |

*FIG. 14*

REDUCING DATA HAZARDS IN PIPELINED PROCESSORS TO PROVIDE HIGH PROCESSOR UTILIZATION

BACKGROUND OF THE INVENTION

This invention relates to pipelined computer processors. More particularly, this invention relates to pipelined computer processors that reduce data hazards to provide high processor utilization.

A processor, also known as a central processing unit, processes a set of instructions from a stored program. The processing of an instruction is typically divided into multiple stages, where each stage generally requires one clock cycle to complete and typically requires different hardware within the processor.

For example, the processing of an instruction can be divided into the following stages: fetch, decode, execute, and write-back. At the fetch stage, the processor retrieves an instruction from memory. The instruction is typically encoded as a string of bits that represent input information (e.g., operands), an operation code ("opcode"), and output information (e.g., a destination address). An opcode represents an arithmetic or logic function associated with the operands. Once the instruction is retrieved from memory, a program counter is either incremented for linear program execution or updated to show a branch destination. The program counter contains a pointer to an address in memory from which a next instruction is fetched. At the decode stage, the processor decodes the instruction into an opcode, operands, and a destination. The opcode can include one of the following: add, subtract, multiply, divide, shift, load, store, loop, branch, etc. The operands, depending on the opcode, can be constants, values stored at one or more memory addresses, or the contents of one or more registers. The destination can be a register or a memory address where a result produced from execution of the opcode is stored. At the execute stage, the processor executes the decoded opcode using the operands. For instructions such as add and subtract, the execute stage typically requires one clock cycle. For more complicated instructions, such as multiply and divide, the execute stage typically requires more than one clock cycle. At the write-back stage, the processor stores the result from the execute stage at the specified destination.

Pipelining is a known technique that improves processor performance by overlapping the execution of instructions such that different instructions are in each stage of the pipeline during a same clock cycle. For example, while a first instruction is in the write-back stage, a second instruction can be in the execute stage, a third instruction can be in the decode stage, and a fourth instruction can be in the fetch stage. In an ideal situation, one instruction completes processing each clock cycle, and processor utilization is 100%. Processor utilization can be determined by dividing the number of program instructions that complete processing by the number of clock cycles in which those instructions complete processing.

Although pipelining can increase throughput (the number of instructions executed per unit time), it increases instruction latency (the time to completely process an instruction). Increases in throughput are restricted by data hazards. A data hazard is a dependence of one instruction on another instruction. An example is a load-use hazard, which occurs when the result of one instruction is needed as input for a subsequent instruction. Instructions (1) and (2) below illustrate a load-use hazard. R0, R1, R2, R3, and R4 represent register contents.

$$R0 \leftarrow R1+R2 \quad (1)$$

$$R3 \leftarrow R0+R4 \quad (2)$$

In the four-stage pipeline described above, the result of instruction (1) is stored in register R0 and is available at the end of the write-back stage. Data dependent instruction (2) needs the contents of register R0 at the beginning of the decode stage. If instruction (2) is immediately subsequent to instruction (1) or is separated from instruction (1) by only one instruction, instruction (2) will retrieve an old value from register R0.

Software techniques that do not require hardware control for reducing such data hazards are known. One technique eliminates data hazards by exploiting instruction-level parallelism to reorder instructions. To eliminate a data hazard, an instruction and its associated data-dependent instruction are separated by sufficient independent instructions such that a result from the first instruction is available to the data-dependent instruction by the start of the data-dependent instruction's decode stage. However, there is a limit to the amount of instruction-level parallelism possible in a program and, therefore, a limit to the extent that data hazards can be eliminated by instruction reordering.

Data hazards that cannot be eliminated by instruction reordering can be eliminated by introducing one or more null (i.e., no-operation or nop) instructions immediately before the data-dependent instruction. Each nop instruction, which advances in the pipeline, simply delays the processing of the rest of the program by a clock cycle. The addition of nop instructions increases program size and total program execution time, which decreases utilization (since nop instructions do not process any data). For example, when each instruction is data-dependent on an immediately preceding instruction (such that the instructions cannot be reordered), two nop instructions should be inserted between each program instruction (e.g., A . . B . . C, where each letter represents a program instruction and each "." represents a nop instruction). The utilization becomes less than 100% for a processor running in steady state (e.g., for instructions A, B, and C, the utilization is 3/7 or 43%; for nine similar instructions, the utilization is 9/25 or 36%), which does not take into account priming or draining. Priming is the initial entry of instructions into the pipeline and draining is the clearing of instructions from the pipeline.

In addition to software techniques, hardware techniques, such as "data forwarding," are known. Without data forwarding, the result of an instruction, which is known at the end of the execute stage, is not available as input to another instruction until the end of the write-back stage. Data forwarding forwards that result one cycle earlier so that the result is available as input to another instruction at the end of the execute stage. With data forwarding, an instruction only needs to be separated from a data-dependent instruction by one independent instruction or one nop instruction. For example, in hardware, a state register R0 can hold a register value X. Without data forwarding, a new value Y can be written into R0 during a cycle n (e.g., a write-back stage) such that Y is available at a next cycle (n+1). Because the new value Y may be needed by an instruction in cycle n, control logic associated with data forwarding enables a multiplexer to output the new result Y, making Y available for another instruction one cycle earlier (cycle n). While data forwarding advantageously provides data one cycle earlier (which improves processor utilization), data forwarding hardware requires additional circuit area which increases cost. Data forwarding also increases hardware complexity, which increases design and verification time.

Furthermore, many hazards cannot be resolved by data forwarding (e.g., cases in which a new value cannot be forwarded). In these instances, stalling the pipeline is an alternative hardware method. Stalling allows instructions ahead of a data-dependent instruction to proceed while the processing of that data-dependent instruction is stalled. Once the hazard is resolved, the stalled section of the pipeline is restarted. Stalling the pipeline is analogous to the software technique of introducing nop instructions, except that the hardware stalling technique is automatic and avoids increasing program size. However, stalling also reduces performance and thus utilization.

In view of the foregoing, it would be desirable to provide a pipelined processor that reduces data hazards such that high processor utilization is attained.

SUMMARY OF THE INVENTION

It is an object of this invention to provide a pipelined processor that reduces data hazards such that high processor utilization is attained.

In accordance with this invention, a processor is provided that uses a restructured set of instructions such that the instructions operate concurrently on multiple pieces of data in multiple passes. A pass is a number of clock cycles in which a subset of instructions operates on a piece of data. In each pass, the same set of instructions operates concurrently on different pieces of data. To attain high processor utilization, the processor is pipelined in two ways. First, the processor preferably has a conventional hardware pipeline in which the execution of an instruction is divided into a number of stages that are overlapped with the stages of other instructions. Second, a piece of data is "software pipelined" in multiple passes by the processor.

Software pipelining in accordance with the invention involves restructuring a set of instructions (e.g., by a compiler) by first reordering instructions to minimize data hazards and then by adding no-operation (nop) instructions to eliminate as many remaining data hazards as possible. The set of instructions is then divided into multiple subsets of instructions, where each is subset of instructions operates on a same piece of data in different consecutive passes. While one subset of instructions operates on a piece of data, a different subset of instructions operates on a different piece of data in the same pass. For example, in a first pass, a first subset of instructions operates on a first piece of data. In the next pass, a second subset of instructions operates on the first piece of data and the first subset of instructions operates on a second piece of data, and so on until all subsets of instructions are operating on data concurrently.

At the beginning and end of the program, the software pipeline is primed and drained, respectively. Priming involves the entry of the first piece of data into the pipeline. When the first subset of instructions starts to process the first piece of data, all other subsets of instructions have no valid data to process and so these instructions act as nops. As each new piece of data starts to be processed, additional subsets of instructions begin to perform useful work and the number of nop instructions decreases until the processor preferably runs at maximum (e.g., 100%) utilization with an instruction exiting the pipeline every clock cycle. Draining involves the clearing of the final piece of data out of the pipeline. As each subset of instructions completes processing the final piece of data, that subset of instructions continues by executing nop instructions until program execution is complete. During priming and draining, the software pipeline runs at less than maximum utilization with only some subsets of instructions processing valid data in a pass. After priming and before draining, the software pipeline preferably runs at maximum utilization as each subset of instructions operates on a different piece of data in the pipeline. As more pieces of data are processed, the overhead of priming and draining the software pipeline becomes smaller and the overall performance of the processor (which includes priming and draining) approaches maximum utilization.

The invention includes a "LOOP" mechanism that allows a program to loop (i.e., to start a new pass). The LOOP mechanism can be implemented explicitly (e.g., by having a LOOP instruction encoded as one of the instructions in the program executed by the processor) or implicitly (e.g., by detecting when a program counter reaches an "end-of-program" value). The effect is the same in both cases: the program counter is typically reset to the address of the first instruction of the first subset, causing the first subset to begin processing a new piece of data. The LOOP mechanism has other effects as well. It can cause a "CurrentPass" counter, which tracks a current pass number, to be updated.

The invention also includes a validity pipeline, which is a piece of hardware that tracks the priming and draining of the software pipeline. The LOOP mechanism preferably causes a validity pipeline to advance. Each pass of a subset of instructions is associated with a stage in the validity pipeline. Before a program begins, a validity bit for each stage is initially cleared. When a subset of instructions begins processing, an associated validity bit is set (e.g., to "1"). When there is no new input data for a particular pass, the validity bit is cleared (e.g., reset to "0"). The processor stops processing when all validity bits are cleared. Every instruction that performs a write to a destination register or memory address is associated with a particular pass. If the validity bit associated with that pass is set, the write is allowed to proceed. Otherwise, the write is inhibited so that the instruction acts as a nop.

Because subsets of instructions execute on is multiple pieces of data concurrently, new addressing modes are provided in accordance with the invention for data-dependent access to processor and system resources (e.g., general-purpose registers and memory). "Pass-dependent register file addressing" is used to access registers within a processor. One arrangement for mapping pass-dependent registers requires that the number of temporary registers for each piece of data be initially known, but not the number of subsets in a program loop. A more preferred arrangement requires that the number of subsets of a loop be known, but not the number of temporary registers.

"Pass-dependent memory addressing" in accordance with the invention is used for memory reads and writes. A memory address is calculated by adding an offset to a base address. The base address, which is the same for all instructions run against a particular piece of data, is preferably stored in the validity pipeline. The offset is preferably encoded within an opcode of an instruction, which is different for each output of a processed piece of data.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which:

FIG. 6 is a diagram illustrating alternatively the pipelining of FIG. 5;

FIG. 7 is a diagram illustrating the pipelining of subsets of instructions in multiple passes for many pieces of data in accordance with the invention;

FIG. 8 is a diagram illustrating alternatively the pipelining of FIG. 7;

FIG. 9 is a table illustrating the priming and draining of a validity pipeline for multiple pipeline passes in accordance with the invention;

FIG. 10 is a table illustrating a preferred arrangement of pass-dependent register file addressing in accordance with the invention;

FIG. 11 is a table illustrating a more preferred arrangement of pass-dependent register file addressing in accordance with the invention;

FIG. 13 is a table illustrating frame pointers in a validity pipeline in accordance with the invention;

FIG. 14 is a table illustrating address mapping in accordance with the invention.

DETAILED DESCRIPTION OF THE INVENTION

Figure 1:
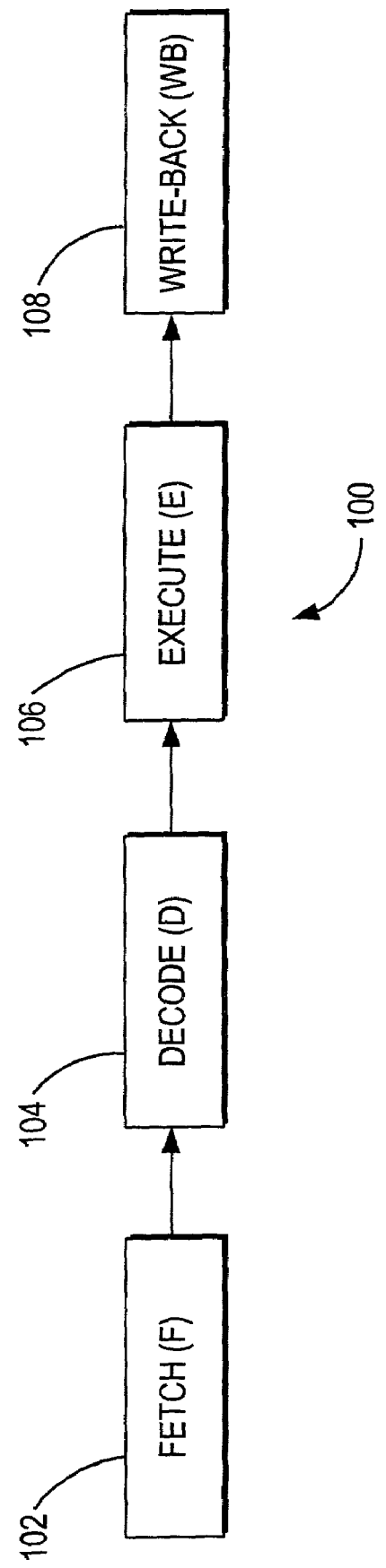
FIG. 1 is a diagram illustrating generally the processing of an instruction in multiple stages.

FIG. 1 illustrates the processing of an instruction in a fetch stage (F) 102, a decode stage (D) 104, an execute stage (E) 106, and a write-back stage (WB) 108. Although process 100 shows only four stages of instruction processing (for clarity), an instruction can be processed in other numbers and types of stages.

Figure 2:
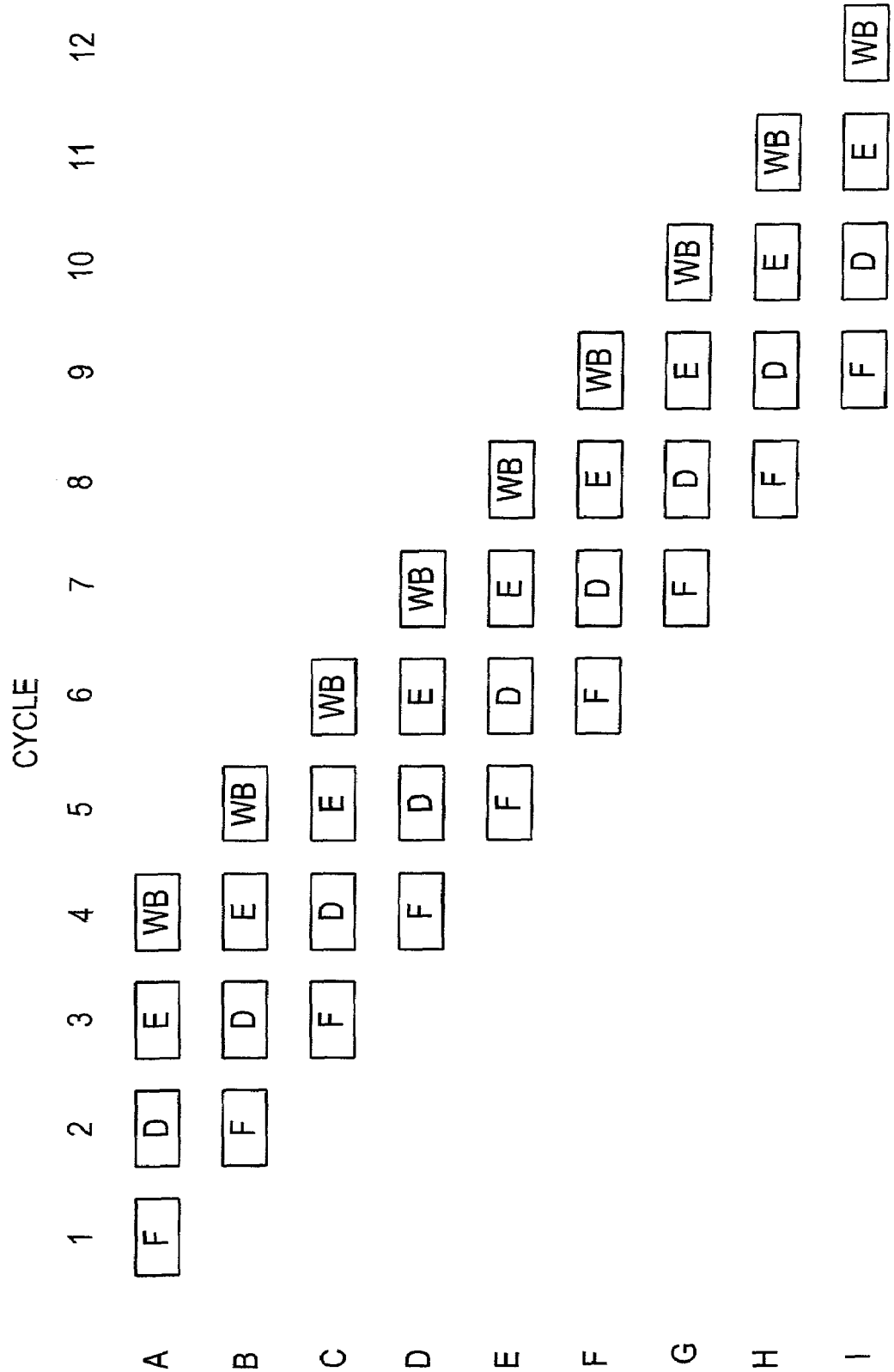
FIG. 2 is a diagram illustrating a known pipelining of multiple instructions without data hazards.

In a pipeline that processes multiple instructions with no data hazards (which can thus run at maximum utilization), an instruction enters the pipeline at each clock cycle and propagates through each stage with each subsequent clock cycle. Upon a first instruction completing the write-back stage, an instruction ideally completes processing every clock cycle thereafter. FIG. 2 illustrates the pipelining of multiple instructions (which have a 1-cycle execute stage) with no data hazards. When the processor is in steady state (i.e., when the first instruction is being processed in a last stage of the pipeline; e.g., when instruction A is in cycle 4), processor utilization is 100%. For more complicated instructions, such as multiply and divide, which require more than one clock cycle for the execute stage, an instruction may not be able to complete processing every cycle and, thus, maximum utilization may be less than 100%.

Figure 3:
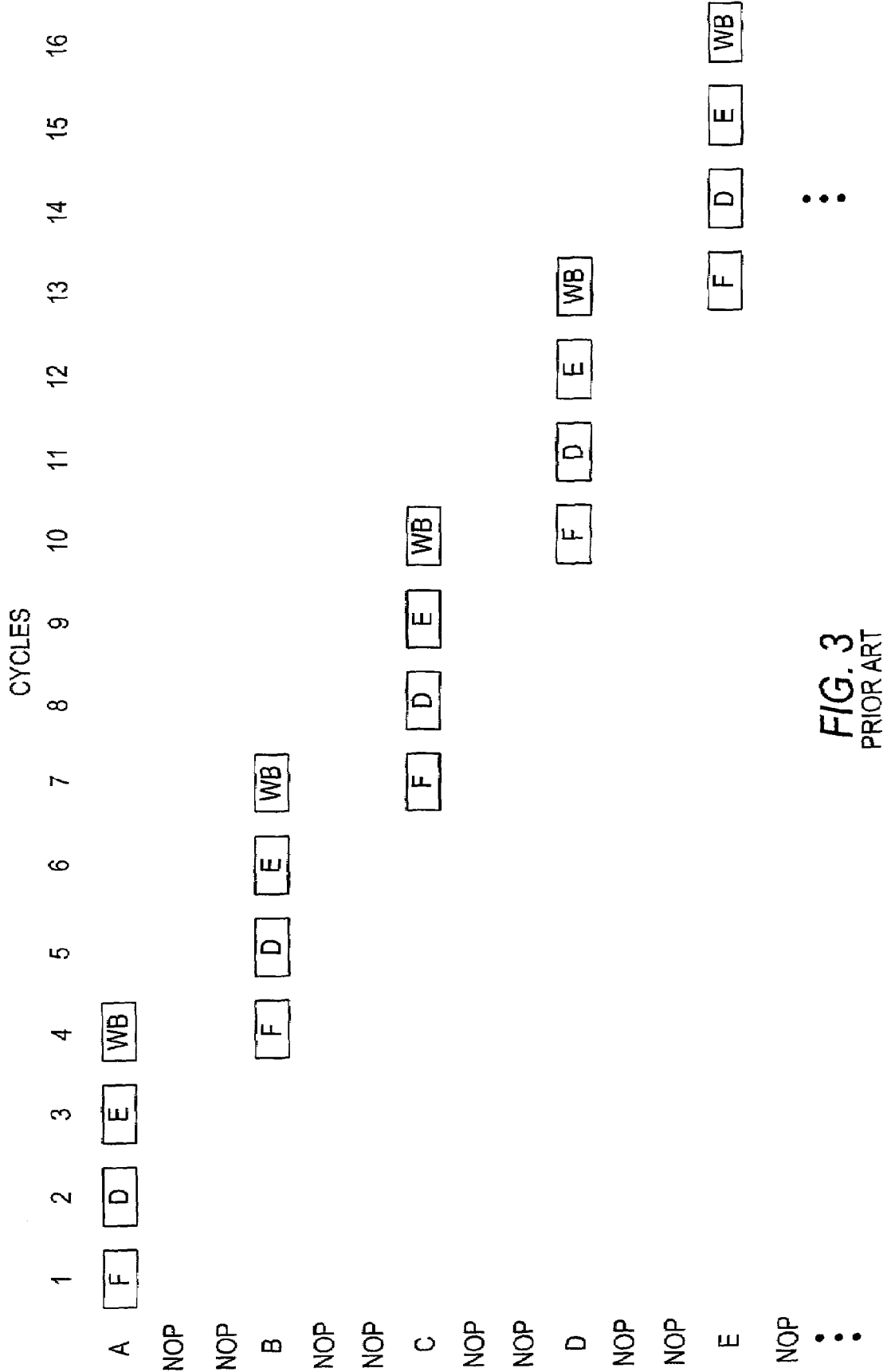
FIG. 3 is a diagram illustrating a known pipelining of multiple instructions with data hazards.

In a pipeline that processes multiple instructions with data hazards, the hazards can be avoided with software that inserts nop instructions between dependent instructions. However, this increases program execution time. FIG. 3 illustrates the pipelining of multiple instructions where each instruction is data-dependent on an immediately preceding instruction.

The invention provides a pipelined processor that reduces data hazards to improve processor utilization by executing a set of instructions in multiple passes concurrently, with subsets of the instructions operating on different pieces of data. The type of program preferably processed by the invention is one that is repeatedly executed (e.g., on different sets of input data) until a predefined condition occurs (e.g., a counter reaches a predefined number). A program's set of instructions is processed in multiple passes. In each pass, one or more subsets of those instructions are processed. For example, a program of nine instructions may be processed in three passes, with subsets of three instructions being processed in each pass. This technique, called "software pipelining," is advantageous for processing many different sets of input data with a fixed algorithm. The more sets of input data, the more likely the processor is to run at maximum utilization, which may be less than 100% depending on the number of cycles required to process each instruction.

In accordance with the invention, a program is first restructured (e.g., by a specialized compiler) before being run on a software pipelined processor. The program's instructions are first preferably expressed as a single instruction sequence without data-dependent branches. Branches can be eliminated by providing an instruction set that allows predicated execution. Predicated execution is the conditional execution of instructions based on a boolean (e.g., true or false) value known as a predicate. These instructions may be executed depending on whether or not a branch would be taken. When the predicate is true, the instructions execute normally and the results, if any, are written to memory or to registers. However, when the predicate is false, the instructions are skipped (i.e., not executed). Second, data hazards are removed by re-ordering instructions and inserting nop instructions. At this point, the processor will operate at less than maximum utilization because of the nop instructions. Third, the sequence of instructions is divided into a number of subsets and interleaved so that all of the nop instructions are replaced by instructions from different subsets. A detailed example of this process is now described.

The instruction sequence A, B, C, D, E, F, G, H, and I (nine instructions) processes a single piece of input data, where each instruction requires two subsequent nop instructions to eliminate data hazards. (Note that the invention is not limited to regular sequences of this type, but is advantageously applicable to instruction sequences with arbitrary data hazards on arbitrary instructions within the sequence.) The execution sequence for this example is expressed as a single instruction sequence without data hazards in accordance with the invention as follows:

$$A\ldots B\ldots C\ldots D\ldots E\ldots F\ldots G\ldots H\ldots I \qquad (3)$$

where each period represents a nop instruction. This sequence is then divided into three subsets of instructions in accordance with the invention as follows:

$$\text{Subset I: } A\ldots B\ldots C\ldots \qquad (4)$$

$$\text{Subset II: }\ldots D\ldots E\ldots F\ldots \qquad (5)$$

$$\text{Subset III: }\ldots\ldots G\ldots H\ldots I \qquad (6)$$

The subsets are arranged so that each subset contains a linear sequential fragment of the original sequence, and each of the subsets are of equal length. If necessary, the lengths of the subsets can be made equal by the addition of nop instructions. As shown, two additional nop instructions are introduced (one between instructions C and D, and one between instructions F and G). The optimum number of subsets required varies from program to program. For a given program, increasing the number of subsets allows processor utilization to increase until it reaches a maximum (which may be less than 100%). This maximum is reached when the number of nop instructions in the program reaches a minimum. Increasing the number of subsets beyond this point will require the addition of nop instructions and will therefore decrease the processor utilization.

Figure 4:
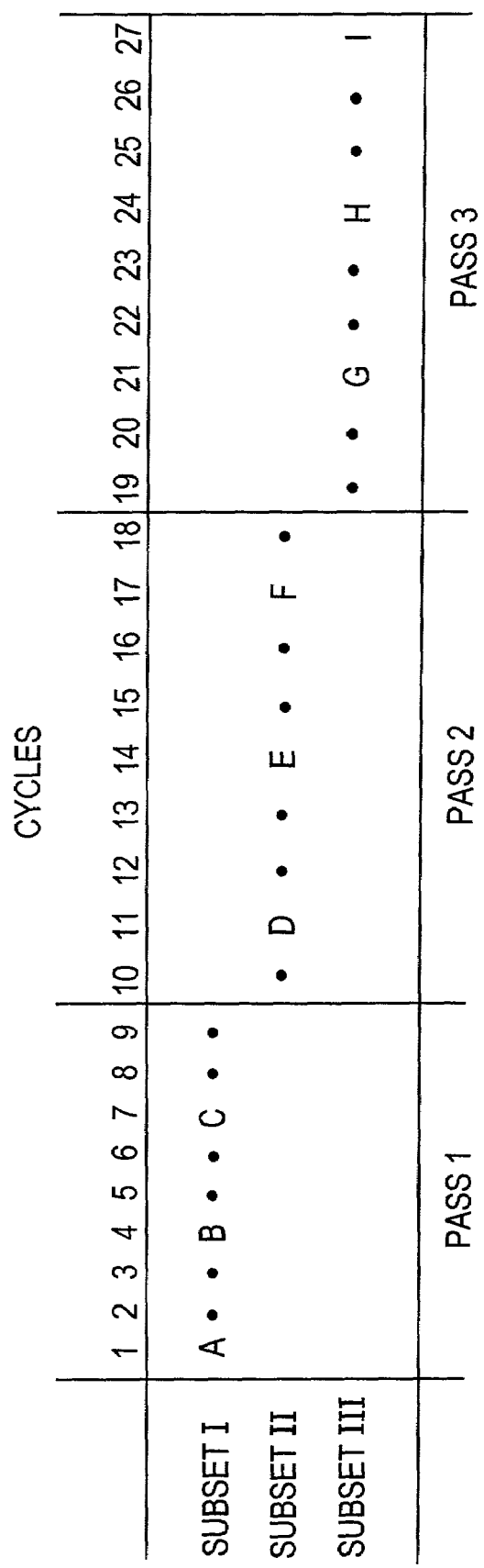
FIG. 4 is a diagram illustrating the pipelining of subsets of instructions in multiple passes for a single piece of data in accordance with the invention.

FIG. 4 illustrates the software pipelining of these three subsets of instructions operating on a single piece of data in three passes while avoiding data hazards. Note that only the first stage (e.g., the fetch stage) of the hardware pipeline for each instruction is represented in FIG. 4 for clarity. Instruction A enters the fetch stage at a first cycle of pass 1. After instruction C enters the fetch stage, two additional nop instructions are processed in pass 1. Instruction D enters the fetch stage at a second cycle of pass 2. After instruction F enters the fetch stage, an additional nop instruction is processed in pass 2. Instruction G enters the fetch stage at a third cycle of pass 3. Instruction I is the final instruction that enters the pipeline in pass 3.

The processor preferably runs a set of instructions on multiple pieces of data concurrently, with each subset of instructions operating on different pieces of data during the same pass, in accordance with the invention. Using the example above with three pieces of data, in pass 1, subset I operates on a first piece of data. In pass 2, subset II operates on the first piece of data while subset I begins operating on a second piece of data. Subsets I and II are preferably interleaved in the hardware pipeline. This can be represented using the notation A(2)D(1)G(-)B(2)E(1)H(-)C(2)F(1)I(-) where the number in parentheses (n) represents the ordinal number of the piece of data being processed and (-) represents a subset that is not yet executing valid data and is therefore executing nop instructions. In passes 1 and 2, the software pipeline is primed as more subsets of instructions are processing valid data, reducing the number of nop instructions processed in the hardware pipeline. In pass 3, subset III operates on the first piece of data, while subset II operates on the second piece of data and subset I operates on a third piece of data. The instructions are again preferably interleaved in the hardware pipeline (e.g., A(3)D(2)G(1)B (3)E(2)H(1) C(3)F(2)I(1)). At this point, the software pipeline is fully primed and the processor is advantageously running at maximum utilization. One instruction completes processing each cycle. This continues until each piece of data has been processed through each subset of instructions. As subsets of instructions finish processing the final piece of data, the software pipeline drains as nop instructions enter the hardware pipeline.

Figure 5:
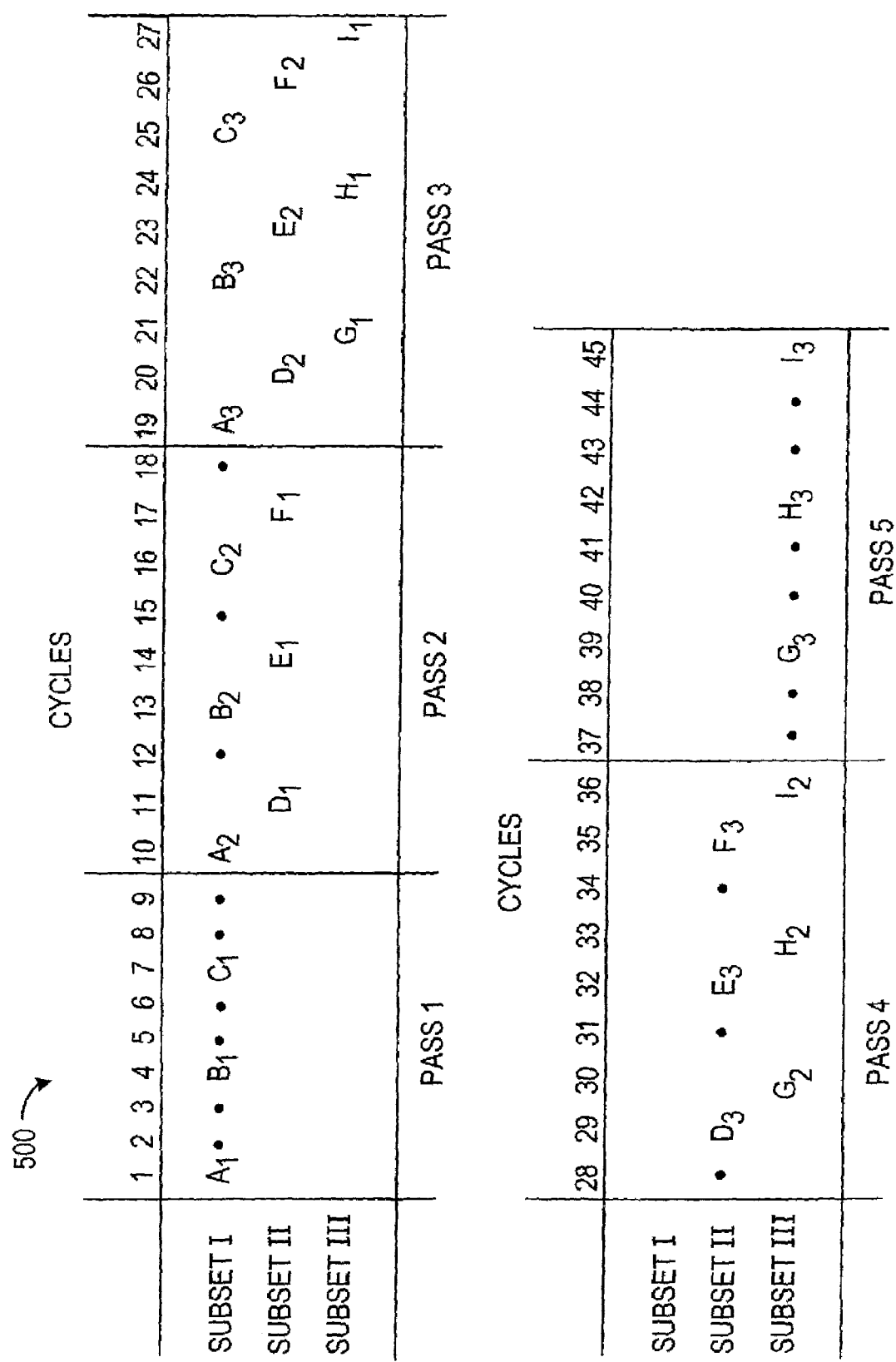
FIG. 5 is a diagram illustrating the pipelining of subsets of instructions in multiple passes for three pieces of data in accordance with the invention.

FIG. 5 illustrates the above pipelining of three subsets of instructions operating on three pieces of data. In pass 1, the processor begins processing a first piece of data (designated as subscript "1" next to a corresponding instruction). In pass 2, the processor begins processing a second piece of data (designated as subscript "2"). In pass 3, the processor begins processing a third piece of data (designated as subscript "3"). By pass 4, the processor has finished processing the first piece of data through all subsets of instructions. By pass 5, the processor has finished processing the second piece of data through all subsets of instructions and is processing the third (final) piece of data through the last subset of instructions (Subset III). In passes 1 and 2, the nop instructions represent the priming of the software pipeline. In pass 3, the processor is running at maximum utilization, and in passes 4 and 5, the nop instructions represent the draining of the software pipeline. In both cases, the nop instructions are actually valid instructions that have been inhibited because there is no valid data to act upon.

FIG. 6 is another illustration of pipelining 500. The instructions are processed from left (instruction A) to right (instruction I) and from top (pass 1) to bottom (pass 5). An instruction not operating on any data (i.e., an instruction that is behaving as a nop instruction) is designated by a "(-)" next to that instruction and preferably occurs only during priming and draining of the software pipeline.

FIG. 7 illustrates the pipelining of three subsets of instructions operating on several pieces of data in accordance with the invention. The more pieces of data that are processed in the pipeline, the more likely the overall performance of the processor is to approach maximum utilization.

The utilization attained when processing a sequence of instructions is dependent upon the following: the total number of instructions in a program, the number of subsets into which the program is divided, and the number of pieces of data processed. For the 3-subset example above, the utilization is given by equation (7):

$$100 * \frac{((((N+2)*I)-I)-I)}{((N+2)*I)} = 100 * \frac{N}{N+2} \quad (7)$$

where "I" is the number of instructions in the program and "N" is the number of pieces of data. In reduced form, utilization depends on only N. Because the value of the numerator (N) will always be less than the value of the denominator (N+2), utilization will be less than loot. This occurs because of nop instructions during priming and draining of the software pipeline. However, as N increases, utilization approaches 100% (i.e., for very large N, the "+2" becomes negligible and (N+2) approximately equals N).

FIG. 8 illustrates pipelining N pieces of data in accordance with the invention. To properly control the software pipeline, the number of subsets (NumberOfSubsets) is preferably programmed into a register before a program starts processing. To process N pieces of data, (N+NumberOfSubsets-1) passes are required, with the software pipeline being primed during a first (NumberOfSubsets-1) passes and being drained during a last (NumberOfSubsets-1) passes. For example, for the 3-subset example above, the number of passes needed to process 6 (N=6) pieces of data is 8 (i.e., 6+3-1). The software pipeline is primed during the first 2 (i.e., 3-1) passes and drained during the last 2 passes.

A "LOOP" mechanism in accordance with the invention causes a first program instruction of a subset to begin operating on a next piece of data at the start of a next pass. For example, as shown in FIG. 8, the loop mechanism causes instruction A to begin operating on a second piece of data at the start of pass 2. This mechanism can be implemented explicitly (e.g., by having a LOOP instruction encoded as one of the instructions in the program) or implicitly (e.g., by detecting when a program counter has reached an "end-of-program" value). The effect is the same in both cases: the program counter is typically reset to the address of the first instruction of the first subset, causing the first subset to begin executing on a new piece of data.

The LOOP instruction has several other functions. When the loop instruction is executed, a current pass counter can be incremented, modulo NumberOfSubsets. The modulo function divides the counter value by NumberOfSubsets and stores the integer remainder in the current pass counter. The current pass counter keeps track of a current piece of data through a given loop. In addition, a validity pipeline can be advanced.

The validity pipeline is a hardware pipeline that uses preferably one or more bits to keep track of valid data in the software pipeline. In particular, it is used to track the priming and draining of the software pipeline. The validity pipeline has a number of stages equal to NumberOfSubsets and a validity bit associated with each stage. Each piece of data can be associated with a validity bit (V) that propagates along the validity pipeline. When a program begins, the validity bit for each stage is initially cleared. When a first subset of instructions (in a first pass) begins processing a first piece of data, a validity bit associated with the first piece of data is set (e.g., to "1") and enters a first stage of the validity pipeline. When a second subset of instructions (in a second pass) begins processing the first piece of data, the validity bit propagates to a second stage of the validity pipeline. Concurrently, when the first subset of instructions begins processing a second piece of data, a validity bit associated with the second piece of data is set (e.g., to "1") and enters the first stage of the validity pipeline.

A data write that changes the state of a system (e.g., by writing to a destination register or to memory) is preferably only allowed if it is caused by an instruction associated with a valid bit (e.g., a bit of "1"). All other writes should be inhibited. This mechanism can cause normal instructions to behave like nop instructions at certain times, particularly during priming and draining of the software pipeline. While reads that have no effect on the state of the system do not need to be inhibited, system performance may be improved by eliminating unnecessary reads associated with invalid passes. When there is no new input data (i.e., the last piece of data has already entered the software pipeline), a cleared validity bit enters the first stage of the validity pipeline. The program stops processing when the validity bits in each stage are cleared.

FIG. 9 illustrates the priming and draining of a 3-stage (NumberOfSubsets=3) validity pipeline for the processing of three pieces of data (N=3). Five passes (i.e., N+NumberOfSubsets−1=5) are required to completely process the data (see, e.g., FIG. 5). Stage 1 is associated with a first pass for a given piece of data, stage 2 is associated with a second pass, and stage 3 is associated with a third pass. At the start of a program, validity bits in each stage are cleared. A first subset of instructions begins processing a first piece of data in pass 1, a second subset of instructions in pass 2, and a third subset of instructions in pass 3. This causes a validity bit to be set (e.g., to "1") in stage 1 during pass 1, which propagates to stage 2 in pass 2 and then to stage 3 in pass 3. By the start of pass 4, the validity bit for stage 1 is reset (e.g., to "0"), because a final piece of data had already entered the software pipeline in pass 3. This cleared validity bit propagates down the pipeline with each subsequent pass. When all the validity bits are cleared, the processor preferably prevents the start of another pass to save power. Program execution can then be stopped under hardware control.

Because a subset of instructions operating on a particular piece of data can be interleaved with other subsets of instructions operating on different pieces of data, new data-dependent addressing modes are preferably implemented in accordance with the invention for some processor and system resources (e.g., memory and general-purpose registers). Global resources (e.g., constants), however, can still be accessed in a data-independent way.

There is preferably a separate set of registers allocated for each piece of data processed by program instructions and an addressing mechanism to access those registers correctly. For example, for a three-subset program, there are preferably three sets of registers: one set associated with each of the first three pieces of data in the software pipeline. For a fourth piece of data to be processed in a fourth pass, the set of registers allocated for the first piece of data can be reused for the fourth piece of data (because the first piece of data has completely processed). This is known as pass-dependent register file addressing.

There are two ways of implementing pass-dependent register file addressing in accordance with the invention. One approach is to allocate a group of physical registers for each piece of data. Each group of physical registers is associated with a parallel set of temporary registers, which can be addressed by the program. The number of temporary registers (NumberOfTemporaries) is typically programmed at the start of program execution. This approach does not require that NumberOfSubsets be known. A more preferred second approach is to allocate a group of physical registers equal to NumberOfSubsets, with the same temporary register number assigned to each physical register in each group, but for a different pass of the program. In both approaches, the number of physical registers required is equal to (NumberOfSubsets*NumberOfTemporaries), and should not exceed the number of registers available.

FIG. 10 illustrates pass-dependent register mapping 1000 in which each group of physical registers (e.g., 1002, 1004, 1006) is associated with a different piece of data. "Pass Used" indicates the pass in which a first subset of instructions for a given piece of data is processed (e.g., a fourth piece of data in a 3-subset program uses the group of physical registers associated with pass 1). "Register Name" indicates the temporary register name that can be addressed by the program.

FIG. 11 illustrates a more preferred pass-dependent register mapping 1100 in which each group of physical registers (e.g., 1102, 1104) contains a number of registers equal to NumberOfSubsets. Each register in groups 1102 and 1104 is assigned the same temporary register name but for different pieces of data. As before, "Register Name" indicates the temporary register name that can be addressed by the program. For a 3-subset program, register R0 is mapped to physical register numbers 0, 1, and 2 for passes 1, 2, and 3, respectively, at 1102.

Instructions operating on a particular piece of data during different passes (subsets) may need to access the same physical register using pass-dependent register file addressing. Using the more preferred register mapping (FIG. 11), the physical register number can be calculated using equation (8) below. Calculation of the physical register number preferably occurs in the instruction decode stage of the hardware pipeline.

$$\text{Physical Register} = (\text{Register} * \text{NumberOfSubsets}) + (\text{CurrentPass} - \text{PassUsed}) \% \text{NumberOfSubsets} \qquad (8)$$

where "Register" is the temporary register number (e.g., 0 for R0, 1 for R1); "PassUsed" is the pass number for a particular subset of instructions for a given piece of data (e.g., a first subset of instructions has PassUsed=1, a second subset of instructions has PassUsed=2, a third subset of instructions has PassUsed=3); and symbol "%" represents the modulo operator. Register and PassUsed are typically invariant for a particular instruction and are preferably encoded within the operands of the instruction. The value of "NumberOfSubsets" is fixed for a given program. "CurrentPass" is the pass at which a piece of data begins processing (e.g., for a 3-subset program, a first piece of data has CurrentPass=1, a second piece of data has CurrentPass=2, a third piece of data has CurrentPass=3, a fourth piece of data has CurrentPass=1). As the processor processes successive passes, it maintains the value of CurrentPass by incrementing a counter. When the counter reaches NumberOfSubsets, the counter resets to 1. As a result, CurrentPass is a number between 1 and NumberOfSubsets (i.e., $1 \leq CurrentPass \leq NumberofSubsets$).

Figure 12:
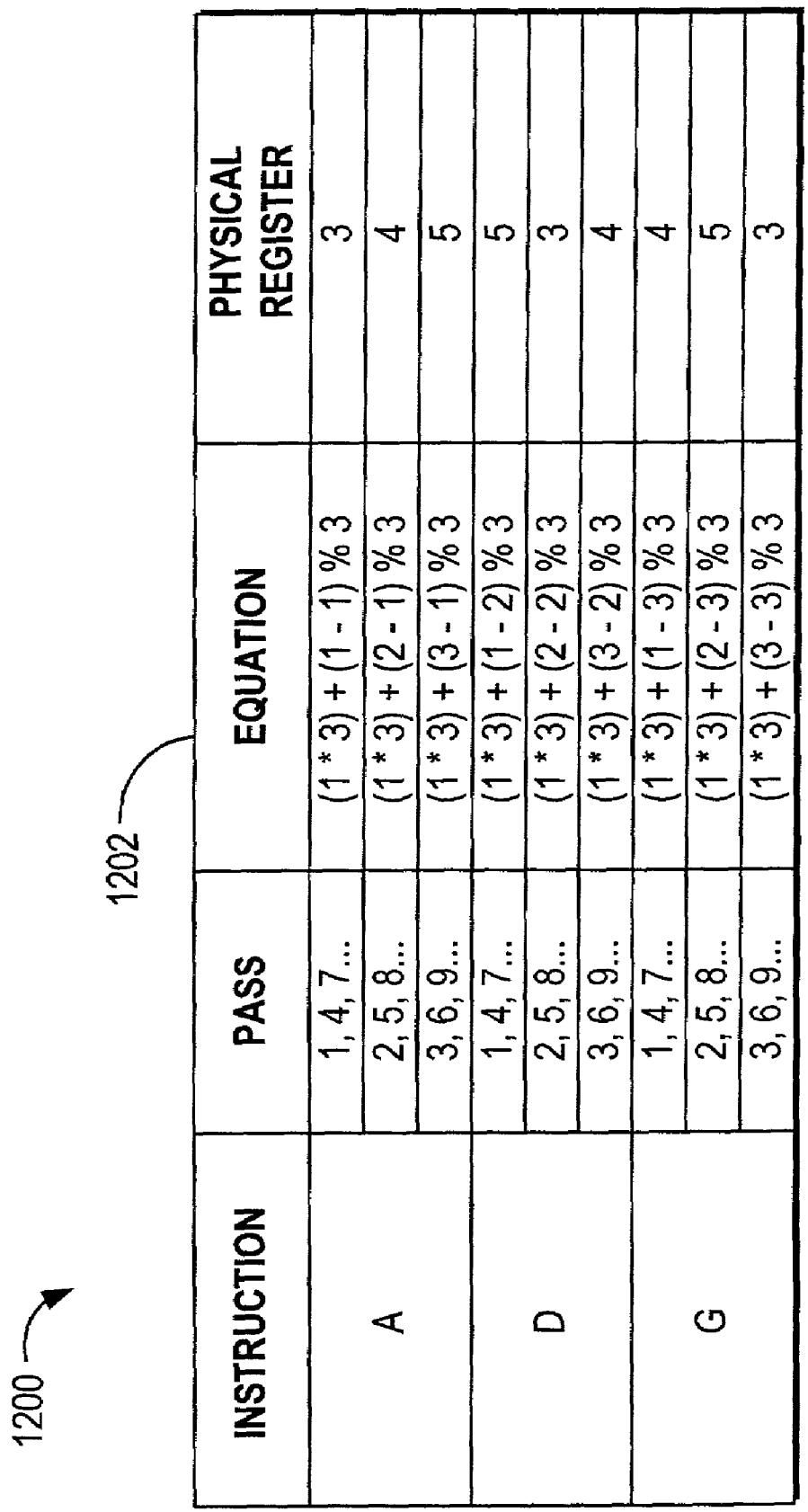
FIG. 12 is a table illustrating register mapping in accordance with the invention.

FIG. 12 illustrates physical register mapping 1200 for temporary register R1 using the 3-subset program of FIG. 7 in accordance with the more preferred mapping arrangement of FIG. 11. For example, consider the processing of a first piece of data by instructions A, D, and G, and suppose that all three instructions require access to register R1. FIG. 7 shows that this processing occurs in passes 1, 2, and 3, respectively. The operands for instructions A, D, and G all encode a register value of 1, and encode a PassUsed value of 1, 2, and 3, respectively. When instruction A processes the first piece of data in pass 1, equation 1202 shows that physical register 3 is addressed. Equation 1202 shows the different values used to calculate the physical register number using equation (8). When instruction A processes a second piece of data in pass 2, equation 1202 shows that physical register 4 is addressed. When instruction D processes the first piece of data in pass 2, equation 1202 shows that physical register 3 is addressed. Similarly, when instruction G processes the first piece of data in pass 3, equation 1202 shows that physical register 3 is addressed. Thus different passes in which the same piece of data is processed can share the same temporary registers. In equation 1202, CurrentPass is the only invariant term for a given instruction. As CurrentPass changes for different passes, a given instruction accesses a same group of physical registers. Because each piece of data accesses a different physical register in the same group, different pieces of data can be independently processed.

In addition to pass-dependent register addressing, it may also be necessary for the program flow associated with a particular piece of data to perform memory reads and writes. A form of pass-dependent memory addressing is therefore provided in accordance with the invention. Because multiple subsets of instructions preferably operate concurrently on different pieces of data, memory locations corresponding to each piece of data are preferably known before a pass starts. For example, if each piece of input data causes the program to perform three writes, it may be necessary to be able to determine a base address for the three writes as a function of an ordinal number of a piece of data. The memory address can be calculated by summing at least two values: one a function of the ordinal number of a piece of data and the other a function of the particular write which is preferably encoded within the program instructions.

For example, if a piece of code generates three outputs for each piece of input data, these outputs can be stored sequentially in memory at offsets 0, 1, and 2 from a base address. Writing to offsets 0, 1, and 2 can occur in any order and the value of each offset (0, 1, 2) can be encoded within the stored instruction.

The address for storing the outputs generated by a piece of code can be calculated by adding a base address (which differs for each piece of input data) to an offset (e.g., the offset can be "0" for a first output, "1" for a second output, and "2" for a third output), which is preferably encoded within the operands of an instruction. Before a program starts, the base address is preferably set and the number of outputs for each input is preferably specified. Each piece of input data can have an associated base address for outputs as shown in (9) below.

Data 0->base address (x)

Data 1->base address (x+3)

Data 2->base address (x+6)         (9)

The base address for each subsequent piece of data is preferably incremented by three to allow storage space for the three outputs from each piece of input data. Alternatively, each piece of data may be assigned a unique base address independent of the base addresses for other pieces of data. The number of separate copies of the base address that are maintained equals NumberOfSubsets. These stored values are called "frame pointers" and are preferably stored in a field within the validity pipeline.

When a valid pass starts, the current value of the base address can be placed into the frame pointer field of stage 1 of the validity pipeline, with a corresponding validity bit set (e.g., to "1"). For invalid passes (V=0), particularly during the priming and draining of the software pipeline, the value of the frame pointer field is irrelevant, since a cleared validity bit (V=0) will inhibit any write instruction, forcing it to act as a nop. The value of the base address is only incremented after it has been assigned to a frame pointer field associated with a valid pass (V=1). Meanwhile, the previous base address is propagated down the frame pointer fields of the validity pipeline to a stage 2 associated with a second subset of instructions for the same piece of data. The size of the output data is preferably not determined during program execution time, but calculated during "compile" time when the program is restructured and the NumberOfSubsets is determined.

FIG. 13 illustrates frame pointers in a validity pipeline (as shown in FIG. 9) in accordance with the invention. Frame pointers (x), (x+3), and (x+6) are associated with valid bits in the validity pipeline. Frame pointers "D/C" (don't care) and (x+9) are associated with invalid bits pertaining to the priming and draining of the software pipeline. No data is stored at these addresses during these passes.

When an instruction performs a load or a store, it preferably specifies the pass in which the load or store is to be done and can also be used to select an associated frame pointer in the validity pipeline. For example, if instructions A, D, and G (in passes 1, 2, and 3, respectively) are to access memory at offsets 2, 0, and 1, respectively, the physical address can be calculated by selecting the appropriate frame pointer from the validity pipeline and adding the frame pointer value to the respective offsets.

FIG. 14 illustrates how the frame pointer values are extracted from the validity pipeline associated with FIG. 13. The offset indicates the location in memory from the base address, and the notation (Frame(n)=m) shows the current value m of the frame pointer field in the nth stage of the validity pipeline. The shaded regions indicate loads or stores that are inhibited because of invalid bits (e.g., V=0) for a given pass. FIG. 14 shows how instructions A, D, and G are encoded to perform stores in their respective passes 1, 2, and 3. By accessing the 1st, 2nd, and 3rd entries in the validity pipeline, the instructions can access the region of memory associated with the same copy of the base address.

Invalid passes (e.g., when V=0) occur during priming and draining of the software pipeline, and may occur during processing, particularly when handling periodic gaps of input data. If input data is available for a new pass, the validity bit is set and the pass proceeds as normal. If input data is not available when the pass starts, the validity bit is cleared for that pass and the pass can still proceed. If input data is available for the next pass, there will be a one-pass "bubble" in the software pipeline, represented by the cleared validity bit. If input data is not available for a time equal to NumberOfSubsets (indicating that all instructions have completely processed the last piece of data), each stage of the validity pipeline will have their validity bits cleared, indicating that the software pipeline has completely drained.

Figure 15:
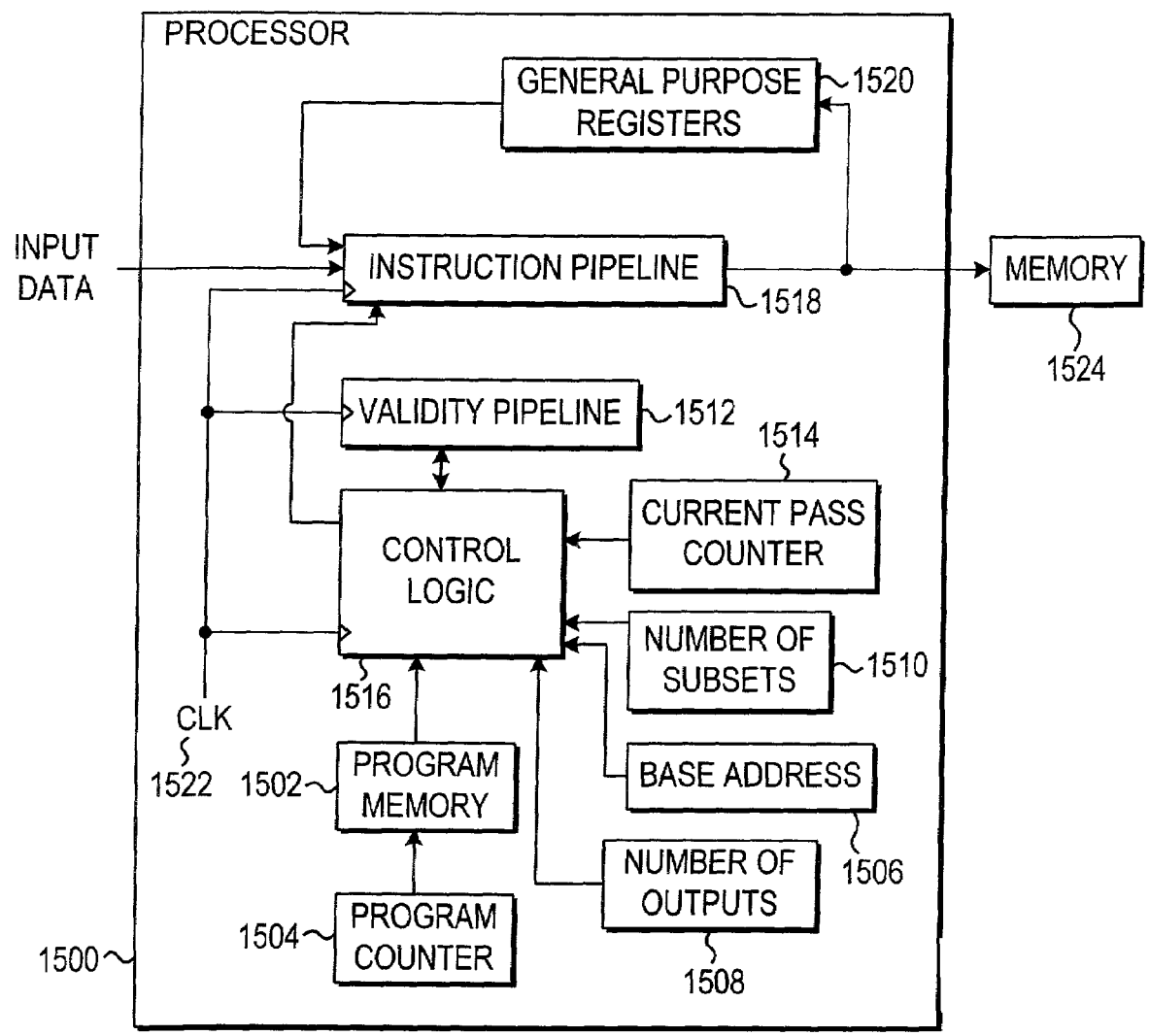
FIG. 15 is a block diagram of a pipelined processor in accordance with the invention.

FIG. 15 illustrates a pipelined processor 1500 in accordance with the invention. During an initial setup, a set of instructions from a program are loaded into a local program memory 1502. Also, initial values are loaded into the following: a program counter 1504, a base address register 1506, a Number-Of-Outputs register 1508, and a Number-Of-Subsets register 1510. In addition, validity bits in a validity pipeline 1512 are cleared and a current pass counter 1514 is set to zero. Furthermore, validity pipeline 1512 is configured to behave as though it has a number of stages equal to the value loaded in Number-Of-Subsets register 1510.

The address of a current instruction in local program memory 1502 is stored in program counter 1504. After the current instruction is fetched, the value in program counter 1504 is updated to reference a next instruction. Control logic 1516 fetches and decodes the current instruction from local program memory 1502. The current instruction is processed in an instruction pipeline 1518, which preferably contains a number of (hardware pipeline) stages to process each instruction. Instruction pipeline 1518 can process input data and data reads from general-purpose registers 1520.

Control logic 1516 controls instruction pipeline 1518 and validity pipeline 1512. Instruction pipeline 1518, validity pipeline 1512, and control logic 1516 are preferably all coupled to a clock 1522, which synchronizes their operation. Each time the program code in program memory 1502 executes a LOOP function, Current-Pass-Counter 1514 is incremented modulo the value in Number-Of-Subsets register 1510, validity pipeline 1512 is advanced, and the current value of base address register 1506 is introduced into the frame pointer field of the first entry of validity pipeline 1512. When the LOOP function is executed and new input data is available, the value introduced into the valid field of the validity pipeline is a "1" and the value in base address register 1506 is incremented by the value in Number-Of-Outputs register 1508. When the LOOP function is executed and no new input data is available, the value introduced into the valid field of the validity pipeline is "0" and the value in base address register 1506 is not modified. Instruction pipeline 1518 reads/writes data from/to either general purpose registers 1520 using pass-dependent or pass-independent register file addressing, or a memory 1524 using pass-dependent or pass-independent memory addressing.

Thus it is seen that data hazards in pipelined processors can be reduced such that high processor utilization is attained. One skilled in the art will appreciate that the invention can be practiced by other than the described embodiments, which are presented for purposes of illustration and not of limitation, and the invention is limited only by the claims which follow.

We claim:

1. A method of operating a pipelined computer processor, said method comprising:
   identifying program instructions dependent upon results of prior program instructions in a set of instructions;
   dividing said set of instructions into a plurality of subsets of instructions, each subset comprising a number of instructions from said set of instructions, each instruction of said set belonging to only one subset; and
   processing at least two of said subsets concurrently in an instruction pipeline, each of said two subsets operating on a different piece of input data, wherein said processing comprises:
      processing in said instruction pipeline a first subset of instructions operating on a first piece of input data during a number of clock cycles to produce a first processed piece of input data, and
      processing in said instruction pipeline said first subset of instructions operating on a second piece of input data and a second subset of instructions operating on said first processed piece of input data concurrently during a next number of clock cycles to generate an output.

2. The method of claim 1 further comprising:
   reordering said set of instructions by placing an independent instruction of said set between two other instructions of said set in which one of said two instructions depends on a result of the other of said two instructions; and
   inserting at least one no-operation instruction between two instructions of said set in which one of said two instructions depends on a result of the other of said two instructions.

3. The method of claim 1 further comprising separating two instructions of said set by placing between said two instructions at least two of any combination of independent instructions of said set and no-operation instructions.

4. The method of claim 1 further comprising:
   inserting at least one no-operation instruction before an instruction dependent upon a result of an immediately prior instruction, said instruction, said no-operation instruction, and said prior instruction belonging to the same subset of instructions; and
   replacing said no-operation instruction with an instruction from another subset such that said instruction from another subset is processed instead of said no-operation instruction.

5. The method of claim 1 wherein said processing comprises:
   fetching an instruction from memory;
   decoding said instruction;
   executing said instruction; and
   storing a result of said executing.

6. A method of operating a pipelined computer processor, said method comprising:
   processing a first subset of instructions in an instruction pipeline operating on a first piece of data in a first pass to produce a first processed piece of data;
   processing said first subset of instructions in said instruction pipeline operating on a second piece of data in a second pass to produce a second processed piece of data;
   processing a second subset of instructions in said instruction pipeline operating on said first processed piece of data in said second pass; and
   processing said second subset of instructions in said instruction pipeline operating on said second processed piece of data in a third pass, wherein:
      said first and second subsets are part of a computer program comprising a set of instructions operative to generate an output, and said first, second, and third passes each comprise a number of clock cycles, said clock cycles for said first, second, and third passes occurring sequentially from a first cycle of said first pass to a last cycle of said third pass.

7. The method of claim 6 wherein said processing a first subset of instructions on a first piece of data further comprises processing a no-operation instruction in a cycle of said first pass between two instructions of said first subset of instructions.

8. The method of claim 6 wherein said processing said first subset of instructions on a second piece of data and said processing a second subset of instructions on said first piece of data in a second pass comprises processing instructions in said first subset of instructions interleaved with instructions in said second subset of instructions.

9. The method of claim 6 wherein said processing said second subset of instructions on said second piece of data further comprises processing a no-operation instruction in a cycle of said third pass between two instructions of said second subset of instructions.

10. A method of operating a pipelined computer processor, said method comprising:
processing a first subset of instructions in an instruction pipeline operating on a first piece of data in a first pass to produce a first processed piece of data;
processing said first subset of instructions in said instruction pipeline operating on a second piece of data in a second pass to produce a second processed piece of data;
processing a second subset of instructions in said instruction pipeline operating on said first processed piece of data in said second pass to produce a third processed piece of data;
processing said first subset of instructions in said instruction pipeline operating on a third piece of data in a third pass;
processing said second subset of instructions in said instruction pipeline operating on said second processed piece of data in said third pass; and
processing a third subset of instructions in said instruction pipeline operating on said third processed piece of data in said third pass; wherein:
said first, second, and third subsets are part of a computer program comprising a set of instructions operative to generate an output, and
said first, second, and third passes each comprise a number of clock cycles, said clock cycles for said first, second, and third passes occurring sequentially from a first cycle of said first pass to a last cycle of said third pass.

11. A method of operating a pipelined computer processor, said method comprising:
dividing a set of computer program instructions into a plurality of subsets of instructions, each subset comprising a number of said program instructions, each program instruction belonging to only one subset;
processing in an instruction pipeline a first subset of instructions operating on a piece of input data in a first pass;
assigning a bit indicating validity in a first stage of a validity pipeline when said first subset of instructions operating on said piece of input data is processed;
processing in said instruction pipeline a second subset of instructions operating on said piece of input data in a second pass; and
propagating said bit in said first stage to a next stage in said validity pipeline when said second subset of instructions operating on said piece of input data is processed.

12. The method of claim 11 further comprising dividing said validity pipeline into a number of stages equal to the number of said subsets of instructions.

13. The method of claim 11 further comprising assigning a second bit indicating validity in said first stage of said validity pipeline when said first subset of instructions operates on a new piece of input data.

14. The method of claim 11 wherein assigning a bit comprises one of:
setting said bit to a first state when valid input data is available when said first subset of instructions begins processing; and
setting said bit to a second state when no valid input data is available when said first subset of instructions begins processing.

15. The method of claim 14 wherein said setting said bit to a first state further comprises thereafter allowing each result of a processing of said set of computer program instructions on said piece of input data to be stored.

16. The method of claim 14 wherein said setting said bit to a second state further comprises thereafter preventing any result of a processing of said set of computer program instructions on said piece of input data from being stored.

17. The method of claim 14 further comprising preventing processing of said set of computer program instructions when each bit in said validity pipeline is in said second state.

18. A method of operating a pipelined computer processor, said method comprising:
dividing a set of instructions into a plurality of subsets of instructions;
allocating a group of physical registers, each physical register identified by a register number, wherein a plurality of pieces of data are stored in said group of physical registers;
assigning each physical register of said group a same temporary register value, wherein said temporary register value is derived from said set of instructions;
calculating one of said physical register numbers that corresponds both to said temporary register value and to a piece of data processed by said set of instructions in an instruction pipeline to read or write said piece of data to said physical register identified by said physical register number; and
re-assigning said physical register with another piece of data after said piece of data has been completely processed through said set of instructions in said instruction pipeline.

19. The method of claim 18 wherein said allocating a group of physical registers comprises allocating a number of physical registers equal to a number of said subsets.

20. The method of claim 19 further comprising assigning a physical register from said group to a piece of data to be processed by said set of instructions.

21. The method of claim 18 further comprising:
allocating a second group of physical registers; and
assigning each physical register of said second group with a second temporary register value.

22. The method of claim 18 wherein said calculating one of said physical register numbers comprises:
combining said temporary register value, a number of said subsets, a pass number of a particular subset, and a current pass number, wherein:

said current pass number is calculated as a function of said number of subsets and a total number of times that a particular subset has been processed, one of said physical register numbers corresponds to a physical register in said group of physical registers that is assigned to said piece of input data, and said combining allows an instruction in any subset that operates on said piece of input data to access said physical register in said group of physical registers.

23. The method of claim 22 further comprising encoding said temporary register value such that said temporary register value is included in an instruction.

24. The method of claim 22 further comprising encoding said pass number of a particular subset of instructions such that said pass number is included in an instruction.

25. The method of claim 18 wherein said calculating one of said physical register numbers comprises:

multiplying said temporary register value by a number of said subsets to produce a first output;

subtracting a pass number of a particular subset of instructions from a current pass number to produce a second output, wherein said current pass number is measured from when a first subset of instructions for a given piece of data is processed;

obtaining an integer remainder from dividing said second output by said number of said subsets to produce a third output; and summing said first output with said third output.

26. The method of claim 25 further comprising encoding said temporary register value such that said temporary register value is included in an instruction.

27. The method of claim 25 further comprising encoding said pass number of a particular subset of instructions such that said pass number is included in an instruction.

28. A method of operating a pipelined computer processor, said method comprising:

dividing a set of instructions into a plurality of subsets of instructions;

allocating a group of physical registers;

assigning each physical register of said group a same temporary register value; and calculating a physical register number that corresponds to said temporary register value and to a piece of data processed by said set of instructions in an instruction pipeline as follows:

(Register * NumberOfPasses)+(CurrentPass−PassUsed) % NumberOfPasses, wherein said Register is said temporary register value encoded in an instruction in said instruction pipeline, said NuxnberOfPasses is a number of subsets, said PassUsed is a pass number of a particular subset of instructions encoded in an instruction in said instruction pipeline; said CurrentPass is measured from when a first subset of instructions for a given piece of data is processed, and said % represents an integer remainder from a division operation.

29. A computer processor operative to process a set of instructions, said processor comprising:

an instruction pipeline that processes a first subset of instructions on a first piece of data in a first pass to produce a first piece of processed data, said instruction pipeline that processes said first subset on a second piece of data to produce a second piece of processed data and a second subset of instructions on said first processed piece of data in a second pass, and said instruction pipeline that processes said second subset on said second processed piece of data in a third pass, wherein:

said first and second subsets are part of a computer program comprising a set of instructions operative to generate an output, and said first, second, and third passes each comprise a number of clock cycles, said clock cycles for said first, second, and third passes occurring sequentially from a first cycle of said first pass to a last cycle of said third pass.

30. The processor of claim 29 further comprising control logic operative to:

insert a no-operation instruction between two instruction in said set of instructions; and divide said set of instructions into said first subset and said second subset, where each subset processes a different piece of data in a same pass.

31. The processor of claim 29 wherein said instruction pipeline processes a no-operation instruction between two instructions of said first subset of instructions when said first subset of instructions operates on said first piece of data.

32. The processor of claim 29 wherein said instruction pipeline interleaves processing of instructions in said first subset with instructions of said second subset when said first subset operates on a second piece of data and said second subset operates on said first piece of data.

33. The processor of claim 29 wherein said instruction pipeline processes a no-operation instruction between two instructions of said second subset of instructions when said second subset of instructions operates on said second piece of data.

34. A computer processor operative to process a set of instructions, said processor comprising:

an instruction pipeline that:

processes a first subset of instructions on a first piece of data in a first pass, processes said first subset on a second piece of data and a second subset of instructions on said first piece of data in a second pass, and processes said second subset on said second piece of data in a third pass; and a validity pipeline coupled to said instruction pipeline that:

assigns a bit indicating validity in a first stage of said validity pipeline upon processing of said first subset, wherein said bit is set to a first state when said first piece of data is valid and is otherwise set to a second state when said first piece of data is not valid, and propagates said validity bit to a next stage of said validity pipeline upon processing of said second subset operating on said first piece of data, wherein:

said first and second subsets are part of a computer program comprising a set of instructions, and said first, second, and third passes each comprise a number of clock cycles, said clock cycles for said first, second, and third passes occurring sequentially from a first cycle of said first pass to a last cycle of said third pass.

35. The processor of claim 34 wherein said validity pipeline is divided into a number of stages equal to the number of subsets of instructions.

36. The processor of claim 34 wherein said bit in said first stage is propagated to a next stage in said validity pipeline when said first subset of instructions operates on a new piece of input data.

37. The processor of claim 34 wherein said bit set to said first state in said validity pipeline allows each result of a processing of said set of instructions on said first piece of input data to be stored.

38. The processor of claim 34 wherein said bit set to said second state in said validity pipeline prevents any result of a processing of said set of instructions on said first piece of data from being stored.

39. The processor of claim 34 wherein said processor prevents processing of said set of instructions when each bit in said validity pipeline is in said second state.

40. Apparatus for operating a pipelined computer processor, said apparatus comprising:
    means for identifying program instructions dependent upon results of prior program instructions in a set of instructions;
    means for dividing said set of instructions into a plurality of subsets of instructions, each subset comprising a number of instructions from said set of instructions, each instruction of said set belonging to only one subset; and
    means for processing in an instruction pipeline at least two of said subsets concurrently, each of said two subsets operating on a different piece of input data, wherein said means for processing comprises:
        means for processing in said instruction pipeline a first subset of instructions operating on a first piece of input data during a number of clock cycles to produce a first processed piece of input data, and
        means for processing in said instruction pipeline said first subset of instructions operating on a second piece of input data and a second subset of instructions operating on said first processed piece of input data concurrently during a next number of clock cycles to generate an output.

41. Apparatus for operating a pipelined computer processor, said apparatus comprising:
    means for processing a first subset of instructions in an instruction pipeline operating on a first piece of data in a first pass to produce a first processed piece of input data;
    means for processing said first subset of instructions in said instruction pipeline operating on a second piece of data in a second pass to produce a second processed piece of input data;
    means for processing a second subset of instructions in said instruction pipeline operating on said first processed piece of data in said second pass; and
    means for processing said second subset of instructions in said instruction pipeline operating on said second processed piece of data in a third pass, wherein:
        said first and second subsets are part of a computer program comprising a set of instructions operative to generate an output, and
        said first, second, and third passes each comprise a number of clock cycles, said clock cycles for said first, second, and third passes occurring sequentially from a first cycle of said first pass to a last cycle of said third pass.

42. Apparatus for operating a pipelined computer processor, said apparatus comprising:
    means for dividing a set of computer program instructions into a plurality of subsets of instructions, each subset comprising a number of said program instructions, each program instruction belonging to only one subset;
    means for processing in an instruction pipeline a first subset of instructions operating on a piece of input data in a first pass;
    means for assigning a bit indicating validity in a first stage of a validity pipeline when said first subset of instructions operating on said piece of input data is processed;
    means for processing in said instruction pipeline a second subset of instructions operating on said piece of input data in a second pass; and
    means for propagating said bit in said first stage to a next stage in said validity pipeline when said second subset of instructions operating on said piece of input data is processed.

43. Apparatus for operating a pipelined computer processor, said apparatus comprising:
    means for dividing a set of instructions into a plurality of subsets of instructions;
    means for allocating a group of physical registers, each physical register identified by a register number, wherein a plurality of pieces of data are stored in said group of physical registers;
    means for assigning each physical register of said group a same temporary register value, wherein said temporary register value is derived from said set of instructions;
    means for calculating one of said physical register numbers that corresponds both to said temporary register value and to a piece of data processed by said set of instructions in an instruction pipeline to read or write said piece of data to said physical register identified by said physical register number; and
    means for re-assigning said physical register with another piece of data after said piece of data has been completely processed through said set of instructions in said instruction pipeline.

* * * * *

UNITED STATES PATENT AND TRADEMARK OFFICE
CERTIFICATE OF CORRECTION

| | |
|---|---|
| PATENT NO. | : 7,200,738 B2 |
| APPLICATION NO. | : 10/125331 |
| DATED | : April 3, 2007 |
| INVENTOR(S) | : Neal Andrew Crook et al. |

It is certified that error appears in the above-identified patent and that said Letters Patent is hereby corrected as shown below:

Column 3, line 41, delete "is" before "subset".

Column 4, line 37, delete "is" before "multiple".

Column 8, line 33, change "loot" to --100%--.

Column 17, line 52, change "NuxnberOfPasses" to --NumberOfPasses--.

Column 18, line 14, change second occurrence of "instruction" to --instructions--.

Signed and Sealed this

Seventeenth Day of July, 2007

JON W. DUDAS
*Director of the United States Patent and Trademark Office*